July 28, 1959
C. M. SELWITZ
2,897,244
PURIFICATION PROCESS
Filed March 21, 1957
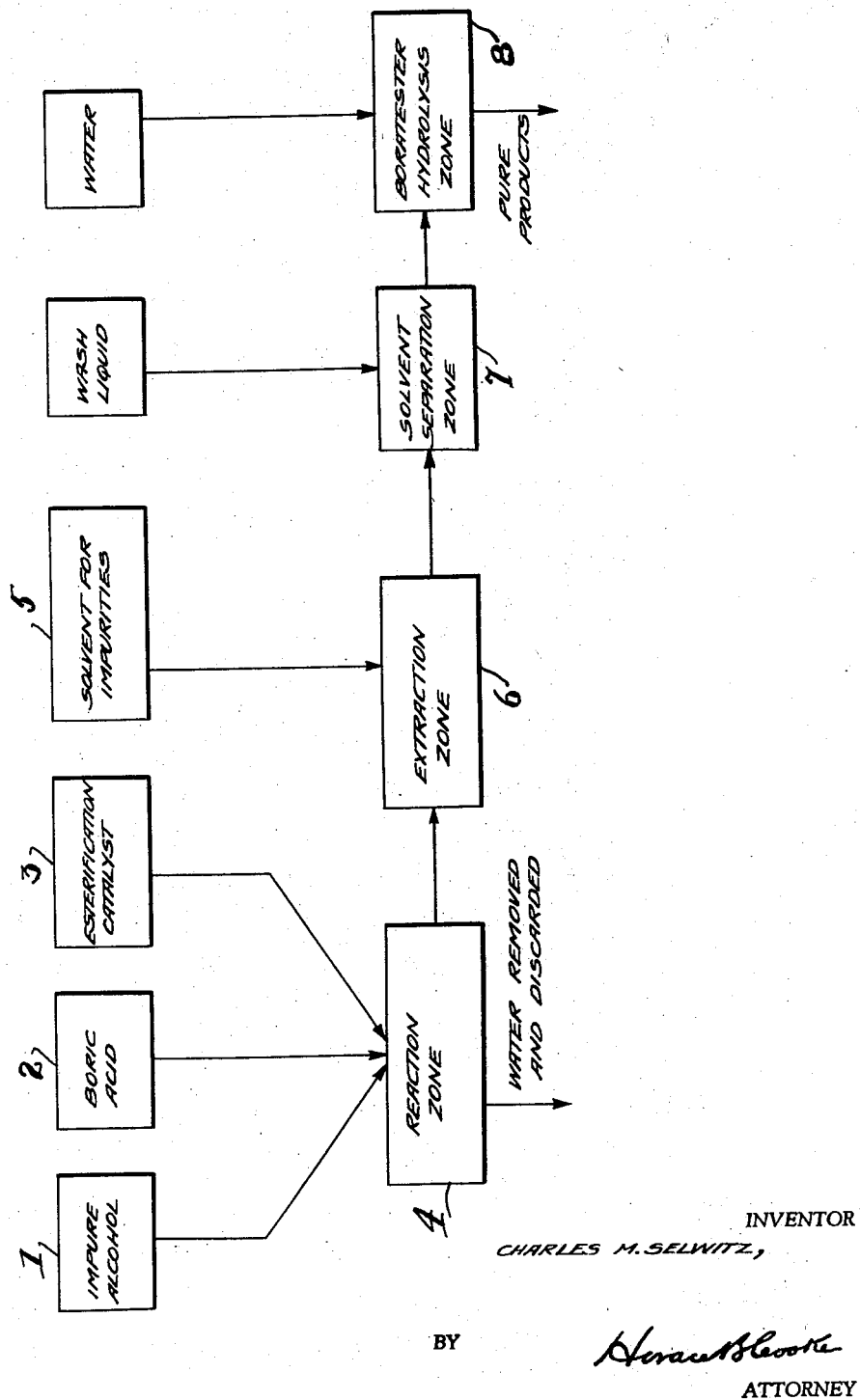
INVENTOR
CHARLES M. SELWITZ,
BY
ATTORNEY United States Patent Office 2,897,244
Patented July 28, 1959

2,897,244
PURIFICATION PROCESS

Charles M. Selwitz, Pittsburgh, Pa., assignor to Gulf Research & Development Company, Pittsburgh, Pa., a corporation of Delaware Application March 21, 1957, Serial No. 647,671

8 Claims. (Cl. 260—643)

This invention relates to a process for the purification of alcohols. More particularly it relates to the purification of high molecular weight alcohols by the preparation, extraction, and decomposition of borate esters.

Alcohols are one of the most widely used organic compounds. Many processes have been perfected for their production. Some of these processes yield a product which is relatively pure or fairly easy to purify. Methanol, for example, can be prepared in a high degree of purity by the reaction of carbon monoxide and hydrogen over certain catalysts and ethanol can be prepared, for example, in a form that can be readily purified by the fermentation of certain carbohydrates in the presence of yeast. Higher alcohols are frequently prepared by the Oxo process in which the alcohols are produced by the addition of one molecule of carbon monoxide and two molecules of hydrogen to compounds containing an ethylenic linkage, in the presence of catalysts such as a metal carbonyl catalyst and a hydrogenation catalyst. The reaction does not always go to completion in a single stage and consequently it is the practice to effect the synthesis in two or more stages. The reaction product from the first stage generally contains some alcohols along with aldehydes and an appreciable amount of catalyst. In the hydrogenation stage of the process the reaction product from the first or hydroformylation stage is hydrogenated with free hydrogen in the presence of a hydrogenation catalyst to convert the aldehydes to alcohols. The products obtained frequently contain appreciable amounts of aldehydes, ketones and other products in addition to the desired alcohols and separation of these products therefrom becomes a serious problem.

Previously disclosed methods of purification involving esterification and distillation are often satisfactory for the purification of lower molecular weight alcohols which have a low boiling point. They are not always satisfactory for the purification of alcohols that have a higher boiling point, for example, cyclohexyl cyclohexanol, 3-octadecanol, 4-methyl pentadecanol - 6,3,5,9 - triethyl hexadecanol-7, etc., and form solid borate esters since such alcohols and impurities are so high boiling that they might be thermally decomposed during the distillation. Vacuum distillation for the separation of such a high boiling mixture is not always satisfactory because the cost of the equipment would be prohibitive and several stages would be required to obtain an alcohol of high purity.

I have found that certain alcohols, defined hereinafter, can be purified by the preparation of the borate ester of the alcohol and extraction of said ester with a polar solvent until a highly-purified borate ester remains. The ester is separated from the remaining mixture, hydrolyzed and pure alcohol recovered. A typical method of carrying out the process is shown in the single figure, which is hereby included in the present specification.

In the first step an impure alcohol 1, boric acid 2 and a suitable esterification catalyst 3 are added to a reaction vessel 4 and heated at a temperature high enough to drive off water which is formed along with the borate ester when an alcohol is reacted with boric acid.

It is preferred that this process be used to purify alcohols that form solid borate esters, since these alcohols are not always readily purified by other methods, and the esters formed are thermally and chemically stable. The ester could be extracted, however, in a liquid-liquid system or cooled below its melting point and extracted as a solid.

While the present process can be employed to purify primary and secondary alcohols, especially preferred results are obtained when the impure alcohol is a secondary alcohol, having groups that provide molecular bulkiness, technically called steric hindrance, which inhibits or avoids transesterification when lower alcohols are used as the extracting medium. Secondary alcohols containing about nine to about forty-one carbon atoms in the molecule can be purified by this process. The process can be utilized particularly for purification of higher secondary alcohols having about nine to about twenty-seven carbon atoms in the molecule. Especially preferred alcohols for purification in accordance with this invention are the higher secondary alcohols having about 25 to 29 carbon atoms in the molecule. Examples of alcohols which may be purified by this process include 2,6-dimethylheptanol, cyclohexyl cyclohexanol, 3-octadecanol, 4-methyl pentadecanol-6,3,5,9-triethylhexadecanol-7,17-tetracosanol, 2,6-dimethylheptacosanol, 12-tricosanol, 13-pentacosanol, 2,26-dimethylheptacosanol-14, etc. The instability and tendency toward transesterification can be mitigated and the extraction process can be used to purify primary alcohols by using a non-alcoholic extraction medium instead of a low boiling alcohol in the esterification step, for example, ketones, ethers and esters such as methoxy diethyl ketone, diisopropyl ether, methoxy methyl acetate, methyl propionate, etc. Primary alcohols which can thus be purified include higher primary alcohols having about 12 to 18 carbon atoms in the molecule. for example, dodecyl alcohol, 7-isopropyl heptadecanol-1, stearyl alcohol, etc.

The process would not be satisfactory for the purification of tertiary alcohols because these alcohols tend to dehydrate rather than esterify and once esterified are extremely resistant to hydrolysis.

Substituents can be present on the alcohol provided the substitutent does not increase the solubility of the ester in the extractant. Thus, chloro or nitro substituents can be in the alcohols having several carbon atoms in the molecule. Examples of such alcohols which can be purified include p-nitrocyclohexyl cyclohexanol, 1,1,1-trichlorotricosanol-12, 6-chloropentacosanol-13, etc.

The ratio of boric acid to alcohol is not critical provided enough boric acid is present to form an ester with the alcohol; a slight excess of boric acid is preferred. The alcohols can be mixed with boric acid in the ratio of about thirty-three hundredths mole of boric acid per mole of alcohol to ten moles of boric acid per mole of alcohol, preferably one mole of boric acid to one mole of alcohol.

The esterification will proceed satisfactorily without a catalyst. However, if it is desirable to speed the reaction or to carry out the reaction at a lower temperature, any suitable esterification catalyst can be used such as an organic catalyst, for example, manganese naphthenate, toluene sulfonic acid, etc., or an inorganic catalyst, for example, stannous chloride, zinc bromide, etc.

Catalyst, when used, is present in minor amounts, generally less than ten percent of the reaction mixture. Especially satisfactory results are obtained, if catalyst is present, when used in a ratio of about two grams of catalyst per one-hundred grams of alcohol charge.

It is absolutely necessary to carry out the reaction at a temperature high enough to remove water formed in the reaction if the solvent used in the extraction step is a low-boiling alcohol, since transesterification would probably occur if water were present. The mixture of alcohol, boric acid and esterification catalyst, when used, is heated at a temperature sufficient to remove water, that is, about 50° C. to about 200° C., preferably the range being about 90° C. to about 130° C.

Pressure is not critical but for reasons of economy and ease of operation I prefer to carry out the purification at atmospheric pressure. However, the reaction can be run at pressures of about ten millimeters to about five atmospheres.

In the second step the ester is extracted with polar solvent 5 which is added to the crude product in the extraction zone 6. Extraction is carried out to remove the impurities from the borate ester. The solvent should be chosen on the basis of an analysis of the impure alcohol and the solvent selected in which the borate ester is insoluble, but the impurities are soluble. Thus, if the impurities are ketones, for example, the extraction medium can be any highly polar low-boiling solvent such as primary alcohols having less than four carbon atoms in the molecule, for example, methanol, ethanol, or propanol. Ketones are not as satisfactory as alcohols, but may be used in the purification of borate esters that would tend to transesterify with an alcohol in the solvent extraction step. Satisfactory ketones for extraction include acetone, methoxy acetone, diethyl ketone, methylethyl ketone, etc., preferably acetone. Certain ethers such as methalal, diethyl ether, diisopropyl ether, etc., are satisfactory solvents as are esters such as methoxy methyl acetate, methyl propionate, ethylacetate, methylacetate, etc. Satisfactory results are obtained when the ester is extracted with solvent in the ratio of about one-half liter of solvent per mole of ester to about one-hundred liters of solvent per mole of ester, preferably about four liters of solvent per mole of ester. In an operation where a continuous extraction system would be attractive for economic or technical reasons, the use of large ratios of solvent would be feasible. Thus 300 grams of solid would be in contact with only 500 milliliters of solvent at any one time but would be extracted with 50 to 100 liters over a protracted period of time. The extraction can be suitably carried out at a temperature of about 30° C. to about 150° C., although the preferred range is about 50° C. to about 90° C., with the pressure being about one-tenth to about ten atmospheres, preferably one atmosphere.

The product can, if desired, be washed in the solvent separation zone 7, to remove the last traces of the solvent from the esters. This washing is not necessary but a slight improvement in the purity of the product results if the ester is washed, since the solvent contains the impurities removed during the extraction.

In cases where the method is used to purify small quantities of alcohol, washing can be accomplished most effectively by the successive use of smaller quantities of the same solvent as used in the extraction.

In the following step the ester is hydrolyzed in the hydrolysis zone 8 and the pure product recovered. Hydrolysis is accomplished by heating the purified ester with a dilute acid or an acid-alcohol mixture since there is no danger of transesterification at this point. The choice of the acid depends on the stability of the esters which vary greatly. Thus, a mineral acid solution of high density would be required to hydrolyze certain esters while others would be hydrolyzed by an aqueous solution of an organic acid, or a dilute solution of a strong mineral acid. Acid suitable for hydrolysis might be chosen from the mineral acids, for example, hydrochloric acid, sulfuric acid, nitric acid, etc., or the organic acids such as acetic, propionic, trifluoroacetic, etc. In hydrolyzing an ester of average stability satisfactory hydrolysis solutions can include, for example, aqueous hydrochloric acid from one-half to thirty percent concentration, aqueous sulfuric acid from one-half to thirty percent concentration or methanol-hydrochloric solutions from one-half to thirty percent concentration. Preferred results are obtained with hydrolysis media such as aqueous hydrochloric acid solutions containing ten to fifteen percent acid, aqueous sulfuric acid solutions containing ten to fifteen percent acid or methanol solutions containing two to fifteen percent concentrated aqueous (35%) hydrochloric acid. An especially preferred hydrolysis medium is approximately five to six percent concentrated aqueous (35%) solution of hydrochloric acid in methanol. Hydrolysis will proceed satisfactorily when the solvent is added in the ratio of about two milliliters of solution per gram of ester to about one-hundred milliliters of solution per gram of ester. The hydrolysis temperature is not critical. Hydrolysis may be carried out at room temperature although a more rapid reaction results when the hydrolysis is carried out at the reflux temperature of the hydrolysis medium. Thus, if the hydrolysis medium is a five to six percent concentrated aqueous solution of hydrochloric acid in methanol, the hydrolysis can be carried out at a temperature from 25° C. to 65° C., the better range being 50° C. to 65° C., the preferred temperature is the reflux boiling point of the hydrolysis solution 60° C. to 65° C. The hydrolysis is complete in about fifteen minutes to one hour.

The pressure is not critical. Hydrolysis can be carried out under pressure of about one to about ten atmospheres, preferably about one to about five atmospheres, but for reasons of economy and ease of operation I prefer to carry out the hydrolysis at atmospheric pressure.

The pure alcohol can be recovered by filtration of the alcohol slurry to remove the hydrolysis solution therefrom. The residue can be washed if desired, with a small quantity of the extracting solvent and allowed to dry at room temperature, or may be dried by evacuation at slightly increased temperatures to remove the solvent.

The process shown in the single figure is purely illustrative of one process in accordance with the invention. It is not intended that the invention be limited to the process steps outlined in the illustration.

The following specific example further illustrates the process:

Example 1

A quantity of 12-tricosanol was prepared by the catalytic hydrogenation of the ketone 12-tricosanone in the following manner. A solution, in methanol, of 150 grams of crude 12-tricosanone was added to an Inconel rocking autoclave. A 20 gram charge of Raney nickel catalyst was added and the autoclave pressurized to 600 pounds per square inch with hydrogen. The autoclave was heated to 1000° C., repressurized to 1000 pounds per square inch with hydrogen and the reaction allowed to continue for 24 hours. The autoclave was cooled, the product removed and warmed under vacuum to remove the methanol. The product was heated to its melting point and filtered through Celite to remove the nickel catalyst. This crude product was contaminated with 12-tricosanone as indicated by a formation of a copious precipitate when checked by the dinitrophenol hydrazine test described in "Shriner and Fusion, Identification of Organic Compounds," Wylie & Co., third ed., 1948. After two recrystallizations from methanol the purity had increased considerably but there was still evidence of the presence of ketone. At this point the alcohol had a melting point of 71.5° C. to 73.2° C.

A 50 gram charge of this product, which was contaminated with approximately five percent of unreacted tricosanone, was placed in a suitable vessel. A charge of five grams of boric acid was added to the impure product along with one milliliter of manganese naphthenate esterification catalyst. The mixture was heated at a temperature of 158° C. to 160° C. at atmospheric pressure to drive off the water formed in the reaction. Thirty-three grams of the crude esterification product was then extracted over a period of 80 hours continuously with methanol using a Soxhlet extractor. The raffinate was isolated by evaporation of the methanol. A yield of 28.3 grams of the ester was recovered. The methanol-free raffinate was hydrolyzed by heating one and nine-tenths grams thereof with a mixture of one-hundred fifty milliliters of methanol and ten milliliters of concentrated aqueous (35%) hydrochloric acid at reflux temperature, approximately 65° C., for thirty minutes. The alcohol was recovered by cooling the slurry to 0° C. by pouring it over ice and filtering the solid to remove the hydrolysis media; 1.86 grams of alcohol was recovered. The solid alcohol was dried by heating to 60° C. for approximately ten hours with evacuation to about fifteen millimeters pressure. The extraction solution was found to contain the ketone. The melting point of this product was found to be 73.8° C. to 74.4° C. without recrystallization. This increase in melting point shows a substantially pure product can be recovered from my extraction process without the necessity of recrystallization. The melting point of 12-tricosanol was reported by F. C. Greusch and S. Sokully, in Ber., 683, 86, No. 6 (1953), as 75.5° C. to 75.7° C.

Obviously many modifications and variations of the invention as hereinabove set forth may be made without departing from the essence and scope thereof and only such limitations should be applied as are indicated in the appended claims.

I claim:

1. A process for the purification of an alcohol selected from the group consisting of primary alcohols having from 12 to 18 carbon atoms in the molecule and secondary alcohols containing from 9 to 41 carbon atoms in the molecule contaminated with an oxygenated impurity which comprises converting the alcohol to the corresponding borate ester, extracting such ester with a polar oxygenated solvent at a temperature of about 30° to about 150° C. and thereby dissolve said impurity but not said borate ester, and thereafter hydrolyzing said borate ester to recover the purified alcohol.

2. A process for the purification of a primary alcohol having from 12 to 15 carbon atoms in the molecule contaminated with an oxygenated impurity which comprises converting the alcohol to the corresponding borate ester, extracting such ester with a polar oxygenated solvent at a temperature of about 30° to about 150° C. and thereby dissolve said impurity but not said borate ester, and thereafter hydrolyzing said borate ester to recover the purified alcohol.

3. A process for the purification of a secondary alcohol having from 9 to 41 carbon atoms in the molecule contaminated with an oxygenated impurity which comprises converting the alcohol to the corresponding borate ester, extracting such ester with a polar oxygenated solvent at a temperature of about 30° to about 150° C. and thereby dissolve said impurity but not said borate ester, and thereafter hydrolyzing said borate ester to recover the purified alcohol.

4. A process for the purification of an alcohol selected from the group consisting of primary alcohols having from 12 to 18 carbon atoms in the molecule and secondary alcohols containing from 9 to 41 carbon atoms in the molecule contaminated with an oxygenated impurity which comprises converting the alcohol to the corresponding borate ester, extracting such ester with methanol at a temperature of about 30° to about 150° C. and thereby dissolve said impurity but not said borate ester, and thereafter hydrolyzing said borate ester to recover the purified alcohol.

5. A process for the purification of a primary alcohol having from 12 to 15 carbon atoms in the molecule contaminated with an oxygenated impurity which comprises converting the alcohol to the corresponding borate ester, extracting such ester with methanol at a temperature of about 30° to about 150° C. and thereby dissolve said impurity but not said borate ester, and thereafter hydrolyzing said borate ester to recover the purified alcohol.

6. A process for the purification of a secondary alcohol having from 9 to 41 carbon atoms in the molecule contaminated with an oxygenated impurity which comprises converting the alcohol to the corresponding borate ester, extracting such ester with methanol at a temperature of about 30° to about 150° C. and thereby dissolve said impurity but not said borate ester, and thereafter hydrolyzing said borate ester to recover the purified alcohol.

7. A process for the purification of 12-tricosanol contaminated with an oxygenated impurity which comprises converting the alcohol to the corresponding borate ester, extracting such ester with a polar oxygenated solvent at a temperature of about 30° to about 150° C. and thereby dissolve said impurity but not said borate ester, and thereafter hydrolyzing said borate ester to recover the purified alcohol.

8. A process for the purification of 12-tricosanol contaminated with an oxygenated impurity which comprises converting the alcohol to the corresponding borate ester, extracting such ester with methanol at a temperature of about 30° to about 150° C. and thereby dissolve said impurity but not said borate ester, and thereafter hydrolyzing said borate ester to recover the purified alcohol.

References Cited in the file of this patent

UNITED STATES PATENTS

| | | |
|---|---|---|
| 2,587,753 | O'Connor et al. | Mar. 4, 1952 |
| 2,746,984 | Rottig | May 22, 1956 |

FOREIGN PATENTS

| | | |
|---|---|---|
| 504,457 | Belgium | Jan. 4, 1952 |

OTHER REFERENCES

Scattergood et al.: J. A. C. S., vol. 67, 2150-2 (1945).

Wender et al.: Report of Investigations, U.S. Dept. of Interior, Bureau of Mines (R.I. 4270, June 1948), pp. 22, 23.

Anderson et al.: J. Applied Chem., vol. 2 (1952), pp. 241–4.

Lappert: Chemical Reviews, vol. 56, No. 5, pp. 969, 971–2.